United States Patent [19]

Chau

[11] Patent Number: 5,776,368
[45] Date of Patent: Jul. 7, 1998

[54] BORATE PHOSPHOR SYNTHESIS USING BORON NITRIDE

[75] Inventor: Chung-Nin Chau, Sayre, Pa.

[73] Assignee: Osram Sylvania Inc., Danvers, Mass.

[21] Appl. No.: 916,383

[22] Filed: Aug. 22, 1997

[51] Int. Cl.$^6$ .............................. C01B 35/12; C09K 11/63
[52] U.S. Cl. ........................ 252/301.4 R; 423/277
[58] Field of Search ...................... 252/301.4 R; 423/277

[56] References Cited

U.S. PATENT DOCUMENTS

| | | | |
|---|---|---|---|
| 2,920,046 | 1/1960 | Ranby | 252/301.4 R |
| 4,173,660 | 11/1979 | Lasky et al. | 252/301.4 R |
| 4,926,091 | 5/1990 | Verlijsdonk et al. | 313/486 |
| 5,154,852 | 10/1992 | Chau | 252/301.4 |

*Primary Examiner*—Melissa Bonner
*Attorney, Agent, or Firm*—Robert F. Clark

[57] ABSTRACT

An improved method for a single step firing synthesis of borate phosphors wherein at least about half the amount of a volatile, low melting point, boron source such as boric acid or boron oxide is replaced with an equivalent amount of boron nitride. The method having the advantages of a single step firing and providing better control over the stoichiometry of the phosphor.

12 Claims, No Drawings

5,776,368

BORATE PHOSPHOR SYNTHESIS USING BORON NITRIDE

TECHNICAL FIELD

This invention relates to methods for making borate phosphors. In particular, this invention relates to the source of boron used in the synthesis of borate phosphors.

BACKGROUND OF THE INVENTION

Borate phosphors such as the green emitting (Gd, Ce, Tb)MgB$_5$O$_{10}$ (CBT) or the red emitting (Y, Gd, Eu)BO$_3$ (YOB) are efficient phosphors which have yet to find broad application in fluorescent lamps. This is in spite of the fact that the green emitting CBT phosphor is a more efficient green phosphor than the green emitting (La, Ce, Tb) PO$_4$ (LAP) or CeMgAl$_{11}$O$_{19}$:Tb (CAT) phosphors typically used in tri-component phosphor blends for tri-band fluorescent lamps.

One of the primary reasons the lamp making industry has not widely adopted the use of borate phosphors is that borate phosphors are difficult to synthesize. Heretofore, boric acid or boron oxide were used as the boron source in the synthesis of borate phosphors. However, because of the relatively low melting points of boric acid and boron oxide, a two-step firing process was required. The first step involved firing the blended raw materials at a lower temperature, about 700° C., to stabilize the borate. This step was followed by a higher temperature firing, about 1050° C. to about 1250° C., to form the phosphor phase. Without the two-step firing, localized melting and formation of a hard sintered cake with uneven phase distribution occurred. Perhaps more importantly, the volatile nature of boric acid and boron oxide made it difficult to maintain proper stoichiometry during synthesis.

SUMMARY OF THE INVENTION

It is an object of the invention to obviate the disadvantages of the prior art.

It is another object of the invention to provide a single step synthesis for borate phosphors.

In accordance with an aspect of the invention, there is provided an improved method for a single step firing synthesis of a borate phosphor from a boron source selected from boron oxide, boric acid or a combination thereof, wherein the improvement comprises replacing at least about half of the boron source with an equivalent amount of boron nitride.

In accordance with another aspect of the invention, there is provided a method for making a borate phosphor having a general formula, (Y$_{1-x-y}$,Gd$_x$,Eu$_y$)BO$_3$, where x is from about 0.1 to about 0.3, and y is from about 0.05 to about 0.12. The method involves combining stoichiometric amounts of a boron source, a yttrium source, a gadolinium source and a europium source to form a mixture, the boron source being comprised of at least about half boron nitride based on the molar amount of boron in the boron source and a remainder comprising boric acid or boron oxide or a combination of boric acid and boron oxide, and firing the mixture at a temperature and for a time sufficient to form the phosphor.

In accordance with still another aspect of the invention, there is provided a method for making a borate phosphor having a general formula, (Gd$_{1-x-y}$,Ce$_x$,Tb$_y$)MgB$_5$O$_{10}$ where x is from about 0.2 to about 0.3 and y is from about 0.1 to about 0.2. The method involves combining stoichiometric amounts of a boron source, a magnesium source, a cerium source, a gadolinium source and a terbium source to form a mixture, the boron source being comprised of at least about half boron nitride based on the molar amount of boron in the boron source and a remainder comprising boric acid or boron oxide or a combination of boric acid and boron oxide, and firing the mixture at a temperature and for a time sufficient to form the phosphor.

DESCRIPTION OF THE PREFERRED EMBODIMENTS

For a better understanding of the present invention, together with other and further objects, advantages and capabilities thereof, reference is made to the following disclosure and appended claims.

It has been discovered that by replacing at least about half of the boric acid or boron oxide used in the synthesis with an equivalent amount of boron nitride borate phosphors may be synthesized in a single step firing process without the disadvantages normally associated with the use of boric acid or boron oxide. The applicability of boron nitride to borate phosphor synthesis is unexpected since the melting point of boron nitride is in excess of about 3000° C. which is more than twice the temperature used to form the phosphor phase.

The general procedure for the improved single step firing synthesis of borate phosphors involves forming a stoichiometric mixture of raw materials, generally oxides, with a boron source comprised of at least about half boron nitride based on the molar amount of boron in the boron source and a remainder of boric acid or boron oxide (or a combination of both) and firing the blended mixture at a temperature and for a time sufficient to form the phosphor. When a volatile boron source, such as boric acid, is present in the synthesis, it is generally desirable to provide an excess of the volatile boron source of about 5 mole percent.

The borate phosphors described herein were prepared from rare earth (RE) oxides (in particular, Group IIIB oxides) containing the desired ratios of rare earth metals. The rare earth oxides were formed by firing oxalate co-precipitates of the rare earths which had been precipitated by oxalic acid addition from aqueous solutions containing the corresponding metal nitrates in the desired proportions. A procedure for obtaining mixed rare earth oxides is described in U.S. Pat. No. 5,154,852 which is incorporated herein by reference.

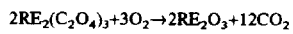

where RE is Y, Gd, Eu, Ce or Tb, or combinations thereof.

The following non-limiting examples are presented. While, the use of boron nitride in the synthesis of two specific borate phosphors will be established below, it is expected that boron nitride can be used to replace boric acid or boron oxide in the synthesis of other borate phosphors, e.g., the phosphors described in U.S. Pat. No. 4,926,091 which is incorporated herein by reference.

(Y, Gd, Eu)BO$_3$ (YOB)Synthesis
Boric Acid Synthesis

The two-step boric acid synthesis of YOB phosphor involves mixing and milling 2.0 moles of RE oxide, (Y$_{1-x-y}$,Gd$_x$,Eu$_y$)$_2$O$_3$, with 4.2 moles of boric acid, and then firing in a covered crucible for about 3 hours at about 700° C. Once cool, the fired cake is crushed, sieved to −270 mesh, and fired in an uncovered crucible for about 5 hours at about 1250° C. The YOB phosphor cake is broken up and sieved to -270 mesh without further milling.

Boron Nitride Synthesis

The boron nitride synthesis of YOB phosphor can be described by the following equation:

$$2(Y_{1-x-y}Gd_xEu_y)_2O_3 + 4BN + 3O_2 \rightarrow 4(Y_{1-x-y}Gd_xEu_y)BO_3 + 2N_2$$

where x is from about 0.1 to about 0.3, and y is from about 0.05 to about 0.12.

EXAMPLE 1

15 g of $(Y_{0.72}Gd_{0.2}Eu_{0.08})_2O_3$ and 2.84 g BN were blended together. The blended mixture was fired at 1250° C. for 3 hours. The fired cake was broken up and sieved to -378 mesh. The x-ray diffraction pattern of the red YOB phosphor synthesized with BN exhibited the same diffraction pattern as that of the standard YOB phosphor prepared from the two-step boric acid synthesis. Analysis of the phosphor surface by x-ray photoelectron spectroscopy (XPS) did not detect the presence of any surface nitrogen.

A systematic study found that the maximum emission intensity for the YOB phosphor in Example 1 appears at a BN:RE oxide molar ratio of about 2:1. Table 1 gives the emission intensity of the YOB phosphor for the various ratios relative to a standard YOB phosphor made according to the two-step boric acid synthesis. The emission intensity of the YOB phosphor synthesized from BN (UV excitation at 220 nm and 204 nm) is as much as 15% higher than the standard YOB phosphor.

TABLE 1

| BN:RE oxide molar ratio | Peak Intensity at 593 nm, % |
|---|---|
| standard (boric acid synthesis) | 100.0 |
| 0.9 | 93.7 |
| 1.0 | 97.5 |
| 1.1 | 102.2 |
| 1.2 | 105.1 |
| 1.3 | 107.4 |
| 1.4 | 105.7 |
| 1.5 | 108.3 |
|  | (108.3) |
| 1.6 | 107.7 |
| 1.7 | 112.7 |
|  | (107.2) |
| 1.8 | 116.5 |
|  | (111.6) |
| 1.9 | 114.5 |
|  | (115.6) |
| 2.0 | 115.5 |

Under this synthesis method, a change in the BN:RE oxide molar ratio will change the emission color whereas an equivalent change in the boric acid synthesis will not. The change in emission color is shown in Table 2.

TABLE 2

| BN:RE oxide molar ratio | CIE x,y color coordinates | |
|---|---|---|
|  | x | y |
| standard (boric acid synthesis) | 0.683 | 0.358 |
| 1.85 | 0.683 | 0.358 |

TABLE 2-continued

| BN:RE oxide molar ratio | CIE x,y color coordinates | |
|---|---|---|
|  | x | y |
| 1.95 | 0.670 | 0.360 |
| 2.0 | 0.672 | 0.362 |

The difference in emission color evident in Table 2 is believed to indicate that the YOB synthesized from boric acid is slightly deficient in boron. This is because a structure deficient in boron would be expected to contain crystal defects affecting emission color and brightness. Because BN is less volatile than boric acid, more boron remains in the synthesis. Hence, the BN synthesis favors the formation of a more stoichiometric phosphor having fewer crystal defects and better brightness.

(Gd, Ce, Tb)MgB$_5$O$_{10}$ (CBT)Synthesis

Boric Acid Synthesis

The two-step boric acid synthesis of CBT phosphor involves preparing a mixture of raw materials in the following relative molar amounts: 0.5 moles RE oxide, $(Gd_{1-x-y}Ce_xTb_y)_2O_3$, 1.0 mole magnesium oxide, 5.2 moles boric acid and 0.02 moles LiF flux; and, firing the mixture in a covered crucible at about 600° C. for about 1 hour. The furnace temperature is then raised to about 1050° C. and the mixture is fired for an additional 2 hours at the higher temperature.

Boron Nitride Synthesis

The synthesis of CBT phosphor can be described by the following equation:

$$2(Gd_{1-x-y}Ce_xTb_y)_2O_3 + 10BN + 2MgO + 15H_2O$$
$$\rightarrow 2(Gd_{1-x-y}Ce_xTb_y)MgB_5O_{10} + 10NH_3$$

where x is from about 0.2 to about 0.3 and y is from about 0.1 to about 0.2.

EXAMPLE 2

A mixture of 10 g of $(Gd_{0.66}Ce_{0.25}Tb_{0.14})_2O_3$, 7.0 g BN and 2.30 g MgO was fired in an alumina crucible in a water vapor enriched atmosphere at 1200° C. for 2 hours. The resulting phosphor cake was broken up and screened.

EXAMPLE 3

A mixture of 10 g of $(Gd_{0.66}Ce_{0.25}Tb_{0.14})_2O_3$, 3.5 g BN, 9.41 g H$_3$BO$_3$, 2.30 g MgO, and 0.04 g LiF (flux) was fired in an alumina crucible in a water vapor enriched atmosphere at 1200° C. for 2 hours. The resulting phosphor cake was broken up and screened. Note that in this example, only about half of the boric acid is replaced with an equivalent amount of boron nitride, i.e., the amount of boron nitride contained the same number of moles of boron as the boric acid being replaced.

XRD analysis of the phosphors produced in Examples 2 and 3 confirmed the presence of the CBT phase. The emission brightness of the two CBT phosphors is compared in Table 3 with a standard CBT phosphor made according to the two-step boric acid synthesis.

TABLE 3

| CBT Phosphor | % lumen brightness |
|---|---|
| standard (boric acid) | 100.0 |
| Example 2 | 95.7 |
| Example 3 | 101.6 |

These results show that BN is effective in producing a borate phosphor in a single step firing synthesis when at least about half the amount of the boric acid and/or boron oxide is replaced with an equivalent amount of boron nitride. The single step borate phosphor synthesis using boron nitride produces a borate phosphor which is at least as bright as the two-step methods using only the volatile, low melting point, boron precursors.

While there has been shown and described what are at the present considered the preferred embodiments of the invention, it will be obvious to those skilled in the art that various changes and modifications may be made therein without departing from the scope of the invention as defined by the appended claims.

I claim:

1. An improved method for a single step firing synthesis of a borate phosphor from a boron source selected from boron oxide, boric acid or a combination thereof, wherein the improvement comprises replacing at least about half of the boron source with an equivalent amount of boron nitride.

2. The method of claim 1 wherein all of the boron source is replaced with an equivalent amount of boron nitride.

3. A method for making a borate phosphor having a general formula, $(Y_{1-x-y}Gd_xEu_y)BO_3$, where x is from about 0.1 to about 0.3, and y is from about 0.05 to about 0.12, comprising:

combining stoichiometric amounts of a boron source, a yttrium source, a gadolinium source and a europium source to form a mixture, the boron source being comprised of at least about half boron nitride based on the molar amount of boron in the boron source and a remainder comprising boric acid or boron oxide or a combination of boric acid and boron oxide; and firing the mixture at a temperature and for a time sufficient to form the phosphor.

4. The method of claim 3 wherein the boron source is boron nitride.

5. The method of claim 4 wherein the temperature is 1250° C. and the time is 3 hours.

6. The method of claim 3 wherein the sources of gadolinium, yttrium and europium comprise a rare earth oxide having a general formula $(Y_{1-x-y}Gd_xEu_y)_2O_3$.

7. A method for making a borate phosphor having a general formula, $(Gd_{1-x-y}Ce_xTb_y)MgB_5O_{10}$, where x is from about 0.2 to about 0.3 and y is from about 0.1 to about 0.2, comprising:

combining stoichiometric amounts of a boron source, a magnesium source, a cerium source, a gadolinium source and a terbium source to form a mixture, the boron source being comprised of at least about half boron nitride based on the molar amount of boron in the boron source and a remainder comprising boric acid or boron oxide or a combination of boric acid and boron oxide; and firing the mixture at a temperature and for a time sufficient to form the phosphor.

8. The method of claim 7 wherein the boron source is boron nitride.

9. The method of claim 7 wherein the temperature is 1200° C. and the time is 2 hours.

10. The method of claim 7 wherein the sources of gadolinium, cerium and terbium comprise a rare earth oxide having a general formula $(Gd_{1-x-y}Ce_xTb_y)_2O_3$ and the magnesium source is magnesium oxide.

11. The method of claim 10 wherein the mixture is fired in an atmosphere enriched with water vapor.

12. An improved method for making a borate phosphor from a mixture of raw materials containing a boron source wherein the improvement comprises using boron nitride as the boron source.

* * * * *